Sept. 20, 1971　　　J. C. DRISKILL　　　3,605,269
DRAFTING AID
Filed April 24, 1969
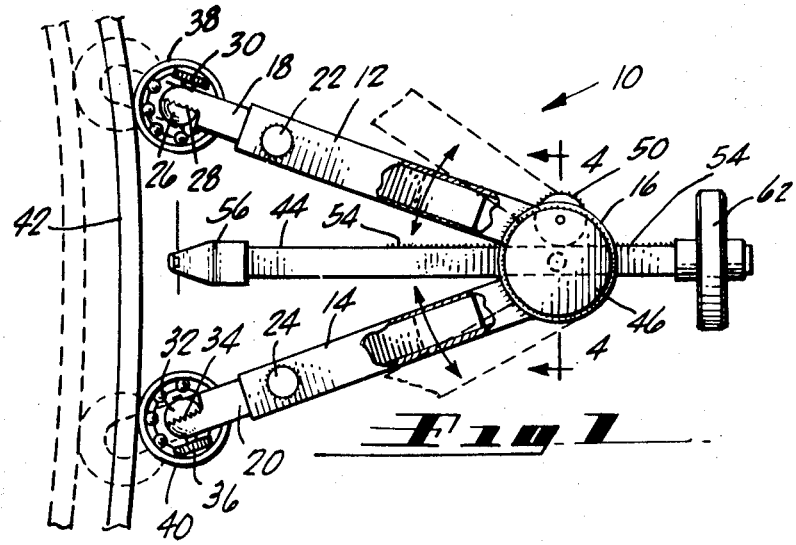
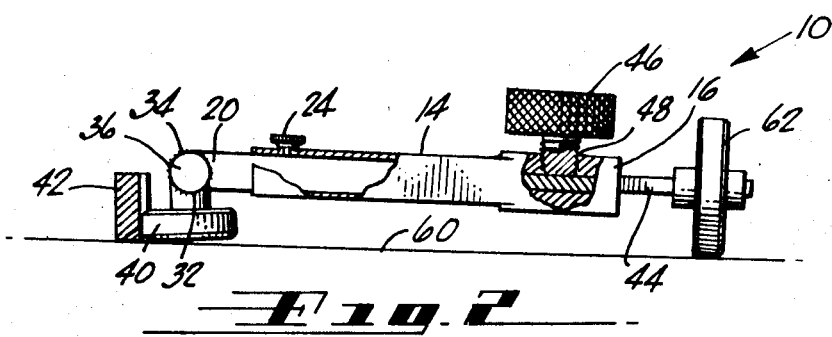
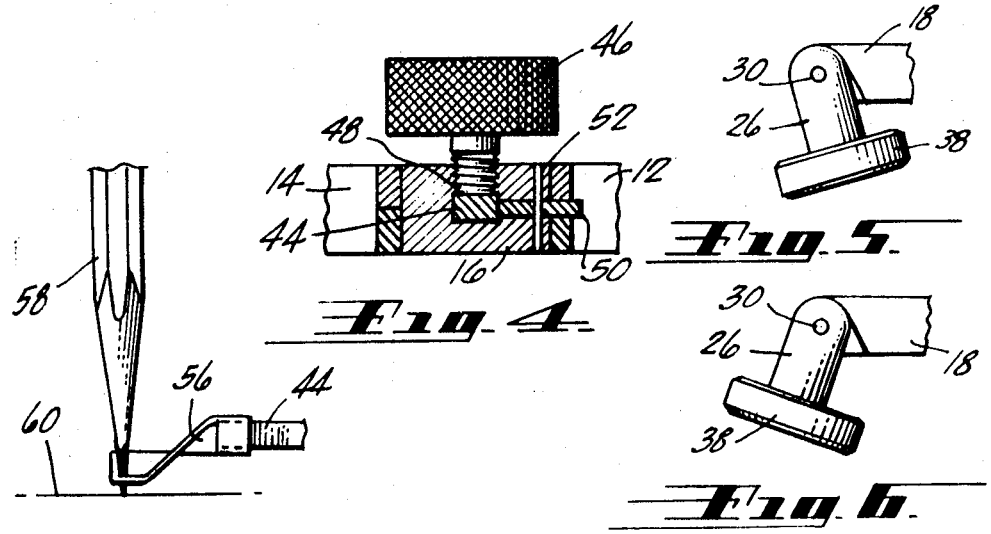
INVENTOR.
JAMES C. DRISKILL
BY Jack C Munro
-AGENT- 3,605,269
DRAFTING AID
James C. Driskill, Long Beach, Calif.
(16291 Hawaii Lane, Huntington Beach, Calif. 92649)
Filed Apr. 24, 1969, Ser. No. 819,002
Int. Cl. B43l 13/02
U.S. Cl. 33—42                                   4 Claims

ABSTRACT OF THE DISCLOSURE

A drafting aid to assist in the drawing of parallel contours from a model contour comprising two leg elements depending from a central hub and adjustable with respect thereto, each leg element being individually longitudinally adjustable, each leg element terminating in a low-frictional device adapted to abut the model contour, each low-frictional device being adjustable with respect to the model contour, a third low-frictional device adjacent the hub to prevent dragging of the hub upon the working surface, a longitudinally adjustable shaft extending between the leg elements, the shaft being capable of being fixed in one position and to permit deployment of a drawing instrument to contact the working surface.

BACKGROUND OF THE INVENTION

In the art of drafting, specifically engineering drafting in the aircraft or railway or other similar type of industry, there is a need in certain instances to draw a series of parallel lines to a specific model contour. For example, it may be as simple as drawing a series of concentric arcs from a circle. It is usually required that these parallel lines be spaced apart a definite distance. Therefore, the spacing of the parallel lines must be accomplished with a high degree of accuracy.

The normal procedure heretofore for the drawing of accurate parallel lines is to plot a series of points for each line every few inches along the length of the model contour at the required spacing from the model contour. Such model contours could be a French curve or any type of curved or straight line contour, and for simplicity of description hereinafter, an all-inclusive term for model contours shall be a "spline." Once the series of points is established for each line to be parallel to the spline, the spline itself is moved and repositioned along the series of points for each line and the individual line is drawn which should be parallel with a reasonable degree of accuracy to the contour surface of the spline. Obviously, this method of drawing parallel lines is quite tedious and time consuming.

It would be of primary advantage to design an instrument which would permit the accurate drawing of a series of parallel lines from a contoured spline, and more particularly, an instrument which would be adaptable to any and every spline contour.

SUMMARY OF THE INVENTION

The apparatus of this invention provides for the construction of a drafting tool having two leg elements depending from a central hub. Each leg element is to be concentrically adjustable upon the hub in substantially the same plane. Each leg element is to terminate at its respective free ends in a low-frictional device wihch is to be contactable with and operable upon a spline. The leg elements are to be capable of being fixedly positioned in various angular relationships with each other. Each leg element is to be adjustable longitudinally to vary the spaced distance of the hub from the spline. A third low-frictional device is employed adjacent to the hub to prevent its frictional contact with the working surface. Each of the low-frictional devices mounted on each leg element is to be adjustable to vary their angular contact with the spline. A shaft is to be located between each leg element and also substantially within the plane established by the leg elements. The shaft is to pass through the hub and to be adjustable with respect thereto. The portion of the shaft between the leg elements terminates in a drawing instrument holder to facilitate accurate placement of the instrument and accurate drawing of the lines.

Although the apparatus of this invention has been found to be especially useful in the drafting art, it is to be noted that use of the invention in other art areas is to be included within the summary of this invention. For example, in the pin-striping of automobiles and boats, a magnetic spline can be attached to the vehicle. The drawing instrument would comprise a pressurized paint applicator. Any number of parallel paint lines of a uniform width and constant spacing could be applied. If the vehicle was formed of a non-metallic surface such as fiber glass, the spline could be attached as by using pressure sensitive masking tape.

Another use of applicant's drafting aid would be in the garment or pattern making industries. A cloth cutting device adapted to the drafting aid would enable various sizes of cloth to be uniformly cut by indexing to only one pattern. Moving the cutter (located in place of the drawing instrument) further away from the pattern would automatically extract a garment of a larger size but in direct proportion to the smaller size pattern.

A still further use of this invention would be to employ a drilling or grinding device in place of a drawing instrument. With this invention, accurate machining operations upon wood, metal or plastic could be achieved.

BRIEF DESCRIPTION OF THE DRAWING

FIG. 1 is a plan view of the drafting aid of this invention showing its use in cooperation with a spline;

FIG. 2 is a side view of the drafting aid of FIG. 1;

FIG. 3 is a partly in section side view showing the relationship of a drawing instrument with respect to the holder;

FIG. 4 is a sectional view of the hub portion of applicant's invention taken along line 4—4 of FIG. 1;

FIG. 5 is an accentuated side view of a low-frictional device to contact the spline showing the device in a first adjusted position; and FIG. 6 is a view similar to FIG. 5 but showing the low-frictional device in a second adjusted position.

DETAILED DESCRIPTION OF THE SHOWN EMBODIMENT

Referring particularly to the drawing, there is shown a drafting aid 10 having leg elements 12 and 14. The leg elements 12 and 14 are pivotally adjustably attached to a hub 16. The attachment to hub 16 of the leg elements 12 and 14 is not shown in detail, but is conventional with reference to common drafting instruments such as dividers and compasses. Each leg element 12 and 14 is adjustable angularly toward and away from each other in substantially the same plane. The leg elements 12 and 14 once established in a desired angular setting can be fixedly positioned by an appropriate set screw arrangement not shown but deemed to be conventional. Leg element 12 at its free end cooperates in a telescoping manner with a rod 18 with leg element 14 cooperatingly in a similar manner with a rod 20. Rods 18 and 20 are longitudinally movable within their respective leg elements 12 and 14 with each rod 18 and 20 being capable of being individually fixed in a particular location by set screws 22 and 24, respectively.

Rod 18 is adjustably secured to a pinion rod 26 through a conventional serrated adjustment 28 employing a set screw 30. Rod 20 is similarly secured to a pinion rod 32 through a conventional serrated adjustment 34 employing a set screw 36. The primary deployment of pinion rods 26 and 32 is in a substantially perpendicular direction with respect to their rods 18 and 20. Attached to pinion rod 26 at its free end is a low-frictional roller bearing 38 with a similar bearing 40 being similarly attached to pinion rod 32. Bearings 38 and 40 are to abut spline 42 during operation of the drafting aid 10.

Referring particularly to FIGS. 5 and 6, there are shown two different angular settings of pinion rod 26 with respect to rod 18. When it is necessary to draw lines in extremely close proximity to the spline 42, the surface of the bearings 38 and 40 may contact the drawn line and cause smearing of the ink or graphite used in drawing the line. To avoid this, the bearings 38 and 40 can be moved to either the angular position of FIG. 5 or that of FIG. 6 or any other angular position therebetween or greater.

Passing through hub 16 and extending between leg elements 12 and 14 is a shaft 44. Shaft 44 is capable of slidable movement within hub 16, but also being capable of being fixedly positioned in a particular location by set screw 46. Set screw 46 is threadingly supported within hub 16 by threads 48. Hub 16 also includes an adjusting wheel 50 which is rotatably supported within hub 16 by pin 52. Wheel 50 has a serrated edge which is to cooperate with ridges 54 upon shaft 44. By rotation of wheel 50, a small incremental lineal movement of shaft 44 is achieved.

Located on the end of the shaft 44 located between the leg elements 12 and 14 is an instrument holder 56. The purpose of holder 56 is to permit insertion of a writing instrument such as a pencil 58 and hold the tip of the pencil 58 exactly perpendicular to the working surface 60, thereby permitting extremely accurate drawing of lines parallel to the contour of the spline 42. The other end of shaft 44 has mounted thereon a low-frictional bearing 62. Bearing 62 is to contact surface 60 and permit substantially frictionless movement of the hub 16 across the surface 60.

The operation of the drafting aid of this invention is as follows. It will be presumed that it is desired to draw one or a series of lines parallel to the contour of the spline 42. The operator then positions the drafting aid 10 so that the bearings 38 and 40 contact spline 42. Also, the line to be drawn must be located between the spline 42 and the hub 16. The shaft 44 can be rapidly moved by loosening set screw 46 and manually moving the shaft 44. Wheel 50 is maintained in an engaged position with shaft 44 and would freely rotate. Wheel 50 can be used for a fine adjustment. In actual practice, the adjustment can be as fine as to the thousandth of an inch. If the line to be drawn is in close proximity to spline 42, the bearings 38 and 40 can be adjusted as shown in either FIG. 5 or 6 to avoid smearing of the drawn line. Once the holder 56 is positioned, the drawing instrument 58 is positioned within holder 56 as shown in FIG. 3. The drafting aid 10 then moves upon its bearings 38, 40 and 62 with the resultant line being drawn. To draw another parallel line, only the shaft 44 need be repositioned.

It has been found that the drafting aid operates more efficiently when shaft 44 is maintained parallel to drawing surface 60. This eliminates the requirement to raise or lower the pencil 58 upon lineal movement of shaft 44. It is to be considered to be within the scope of this invention to have an adjustable collar connection (not shown) between the bearings 38 and 40 and their respective rods 26 and 32, the position of the rods 26 and 32 being capable of being fixedly positioned by set screws. Such an arrangement could insure that shaft 44 would be parallel to the drawing surface 60 regardless of the angular position of rods 26 and 32.

It is also to be considered to be within applicant's invention to substitute followers for bearings 38 and 40. For example, it may be desirable to employ a single ball bearing (such as employed in ball point pens) which could be used to follow a drawn line thereby negating the use of a spline. Other types of followers could be readily used such as blade followers or the like.

I claim:
1. A drafting aid for facilitating drawing of lines upon a working surface parallel to a fixed contoured surface comprising:

first and second leg elements depending in an acute angular relationship from a hub portion, said leg elements being adjustable toward and away from each other with respect to said hub portion, each of said first and second leg elements being adjustable longitudinally, the free ends of each of said leg elements being connected to a low-frictional device to facilitate ease of movement of said leg elements with respect to a contoured surface;

a shaft passing through said hub portion and having a first section located intermediate said first and second leg elements and in substantially the same plane of said leg elements, said shaft being adjustable longitudinally with respect to said hub portion but also being capable of being fixedly positioned in a particular location, a third low-frictional device attached to a second section of said shaft adjacent to said hub portion, said third low-frictional device facilitating ease of movement of said hub portion with respect to the working surface;

a holder mounted on a free end of said first section of said shaft, said holder being capable of cooperating with a writing instrument to permit drawing or scribing of lines upon the working surface; and each of said low-frictional devices being angularly adjustable with respect to their respective leg elements.

2. An apparatus as defined in claim 1 wherein:
said low-frictional devices and said third low-frictional device are roller bearings.

3. An apparatus as defined in claim 2 wherein:
an adjustment wheel is connected to said hub portion, said wheel cooperates with said shaft to permit minute adjustment thereof.

4. An apparatus as defined in claim 3 wherein:
said wheel has a serrated edge, said serrated edge cooperates with ridges upon said shaft.

References Cited
UNITED STATES PATENTS

| | | | |
|---|---|---|---|
| 1,792,393 | 2/1931 | Phillips | 33—42 |
| 3,052,033 | 9/1962 | Studt | 33—42 |
| 2,007,396 | 7/1935 | Howard | 33—41 |
| 2,660,791 | 12/1953 | Howell et al. | 33—41 |

FOREIGN PATENTS

| | | | |
|---|---|---|---|
| 538,687 | 8/1941 | Great Britain | 33—41 |

LEONARD FORMAN, Primary Examiner

C. E. PHILLIPS, Assistant Examiner

U.S. Cl. X.R.
401—193